United States Patent [19]

Elshout

[11] Patent Number: 5,120,517

[45] Date of Patent: Jun. 9, 1992

[54] PROCESS FOR THE REMOVAL OF SULFUR OXIDES AND NITROGEN OXIDES FROM FLUE GAS

[75] Inventor: Raymond V. Elshout, Pasadena, Calif.

[73] Assignee: Pacific Gas Supply Corporation, Novato, Calif.

[21] Appl. No.: 646,431

[22] Filed: Jan. 28, 1991

[51] Int. Cl.$^5$ .................. B01J 8/00; C01B 21/00; C01B 17/02
[52] U.S. Cl. .................. 423/239; 423/244; 423/576
[58] Field of Search ............... 423/244 A, 244 R, 239, 423/239 A, 235, 235 D, 573.1, 576

[56] References Cited

U.S. PATENT DOCUMENTS

| | | | |
|---|---|---|---|
| 3,752,877 | 8/1973 | Beavon | 423/244 |
| 3,864,452 | 2/1975 | Chi et al. | 423/244 |
| 3,953,587 | 4/1976 | Lee et al. | 423/576 |

Primary Examiner—Gregory A. Heller
Attorney, Agent, or Firm—Philip D. Junkins

[57] ABSTRACT

A continuous process for removing sulfur oxide and nitrogen oxide contaminants from the flue gas generated by industrial power plants and boiler system burning sulfur containing fossil fuels. The sulfur oxide and nitrogen oxide contaminants removed from the flue gas are converted, respectively, into elemental liquid sulfur product, and into nitrogen gas, ammonia gas and mixtures thereof which are released to the atmosphere thus reducing industrial air pollution.

16 Claims, 1 Drawing Sheet

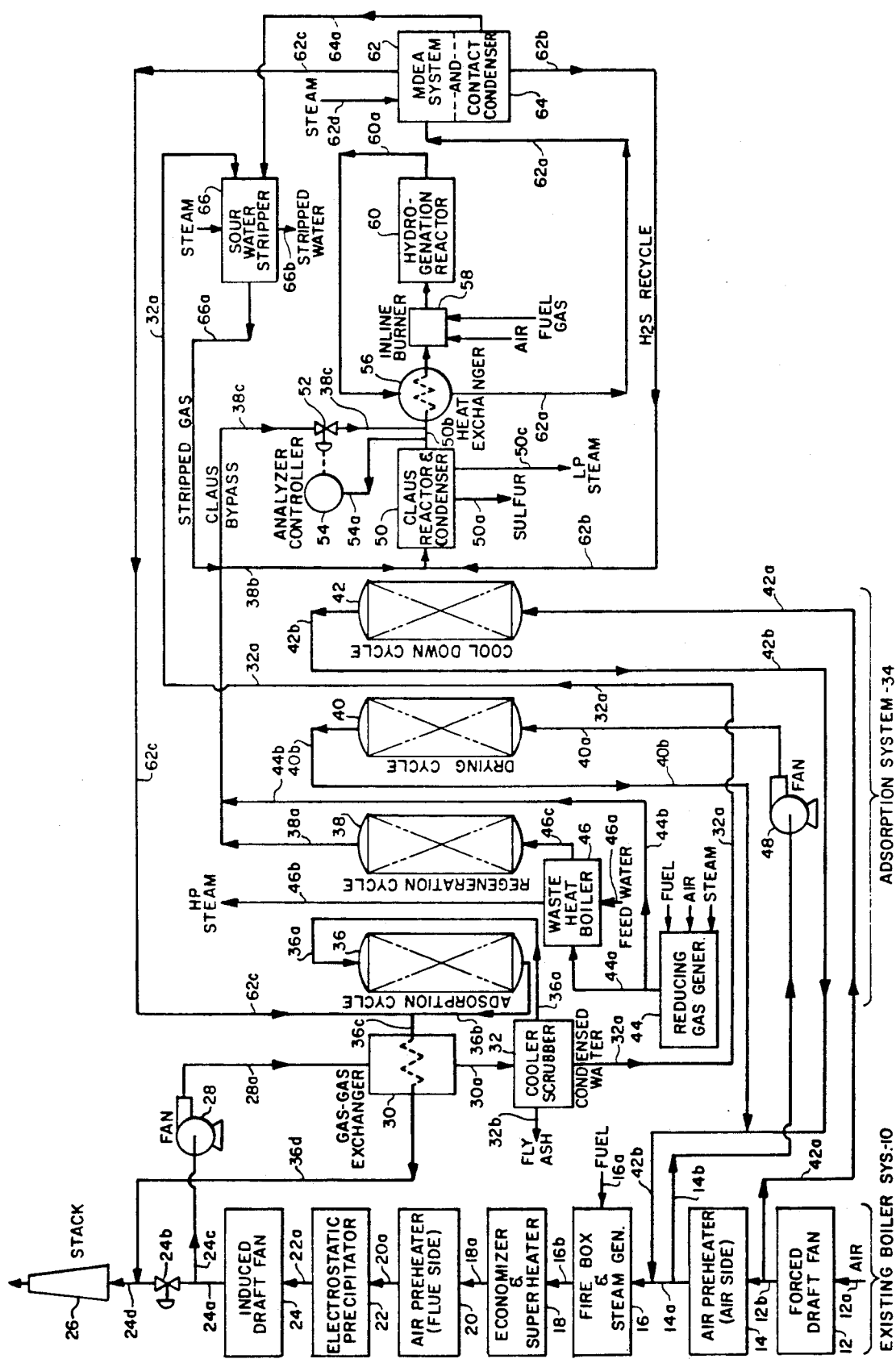

PROCESS FOR THE REMOVAL OF SULFUR OXIDES AND NITROGEN OXIDES FROM FLUE GAS

BACKGROUND OF THE INVENTION

The present invention relates to the removal of sulfur oxides and nitrogen oxides from the flue gases of combustion apparatus which burn high sulfur fuels. Boilers, fired heaters and other combustion devices and systems which burn high sulfur fossil fuels such as coal, petroleum coke, heavy fuel oil and other bituminous fuels produce flue gases containing about 1,000 to about 3,000 ppm of sulfur oxides and about 700 to about 1,500 ppm of nitrogen oxides or NOX. The majority of these sulfur oxide emissions in the United States are from electric utilities and industrial power plants.

Numerous processes have been developed over the years to remove sulfur dioxide from stack gases. Other processes and combustion technology have been developed to reduce NOX emissions. Most of the current sulfur oxide removal processes use some type of alkali scrubbing techniques wherein the sulfur oxides are absorbed in alkali solutions of limestone. The sulfur oxides are precipitated from such solutions and are ultimately disposed of as a solid waste. These flue gas scrubbing processes not only consume large quantities of chemicals but also produce additional waste materials which must be disposed of. Furthermore, these alkali scrubbing systems do not remove any of the nitrogen oxides contained in the flue gas. The sulfur removal efficiency of these scrubbing methods is claimed to be between 50 and 90 percent of the sulfur oxide content.

In the United States, environmental regulations, including the "Acid Rain Act" (Clean Air Act), require the power industry of the coutry to remove additional percentages of sulfur oxides and nitrogen oxides from the flue gases of combustion apparatus. Further, state and local legislation is now being enacted to limit the quantities of sulfur-bearing solid wastes which can be sent to landfill space.

The recovery of sulfur from the flue gases of combustion apparatus is complicated by the relative dilute concentrations of sulfur oxides therein and the presence of excess oxygen and particulate matter in such gases. In recent years oil refinery sulfur plants have employed tail gas treating processes to reduce the emissions of sulfur oxides from such plants. Sulfur oxide emissions from refineries are about 10 times as concentrated as the sulfur oxides in boiler flue gases. The present invention utilizes a novel approach to the recovery of sulfur which combines adsorption technology to concentrate the toxic substances contained in the stack gas of combustion apparatus and refinery sulfur plant tail gas technology to recover elemental liquid sulfur and remove NOX. Thus, sulfur oxides are first removed from the stack gas of the combustion apparatus as a more concentrated stream and then such stream is converted to elemental liquid sulfur which is recovered as a product. Nitrogen oxides are converted to nitrogen and ammonia.

The recovery of sulfur compounds, including sulfur oxides, carbonyl sulfide and carbon disulfide, from the tail gas produced by Claus Sulfur Recovery Units in the oil refining and gas processing industry has been disclosed by Beavon in his U.S. Pat. No. 3,752,877. According to Beavon all sulfur species in the Claus tail gas are catalytically hydrogenated to hydrogen sulfide in the presence of hydrogen or a reducing gas. The hydrogen sulfide is then removed from the tail gas using the Stretford process or other liquid phase oxidation processes which produce elemental sulfur as a solid by-product. The liquid phase oxidation processes produce spent solvent which contain hazardous toxics. Hydrogenation of the Claus tail gas and recovery of hydrogen sulfide with a selective acid gas solvent for recycle back as feed to the Claus unit has also been previously known.

The sulfur oxide concentration in the Claus tail gas is about 10 times as high as the concentration of sulfur oxide in flue gas. The Claus Unit tail gas does not contain any excess oxygen, whereas boiler flue gas contains excess oxygen typically ranging between 2 to 5 volume percent which would consume large amounts of valuable hydrogen during the hydrogenation step. The oxygen hydrogenation reaction is highly exothermic which results in a large heat release and the temperature rises in the hydrogenation reactor with typical flue gas oxygen concentrations. Conventional tail gas processing is therefore not directly applicable to stack gas cleanup.

Neal in U.S. Pat. No. 4,755,499 and Magder in U.S. Pat. No. 4,323,544 propose using an alumina sorbent for removing nitrogen oxides and sulfur oxides thereafter regenerating the sorbent with a hot stream of hydrogen sulfide or hydrogen. The sorbent is regenerated at temperatures of up to 650° C. producing elemental sulfur. Hydrogen sulfide, however, is usually not available in the quantities required at most coal burning boiler sites. Also, the 650° C. regeneration temperature requires very expensive equipment.

Vorin et al in U.S. Pat. No. 4,283,380 describe a process in which $SO_2$ and $SO_3$ are absorbed by a non-alkalized alumina in the form of sulfates using a fluid bed absorber. The absorbent is subsequently regenerated using a hydrogen sulfide containing gas which produces elemental sulfur. This process requires a high operating temperature of 400° C. for regeneration and a source of hydrogen sulfide gas which is not usually available at a power generating plant. Fluid bed technology is also used with long residence times which requires very large equipment for typical power plants.

Knoblauch et al in U.S. Pat. No. 4,452,772 describes a process in which a fluidized bed of carbonaceous material is heated by combustion with air forming a reducing gas that reacts with a portion of the sulfur dioxides contained in a flue gas thereby producing hydrogen sulfide. The $H_2S$ to $SO_2$ ratio from the fluid bed is controlled at 2 to 1. The reactor temperature is regulated so that elemental sulfur is subsequently formed and recovered by Claus reaction technology. The primary disadvantages of this process are the very high operating temperatures of 850° C. to 950° C. required in the fluid bed and the requirement to control both the temperature and the reducing gas produce by air flow regulation. No NOX reduction is achieved by the process and considerable sulfur compounds are contained in the emitted tail gas in the form of COS and other sulfur-containing species from the Claus reaction.

Fornoff in U.S. Pat. Nos. 3,988,129 and 3,829,560 describes a process in which a molecular sieve can be used to recover sulfur dioxide from the effluent of a sulfuric acid process. The molecular sieve is regenerated by purging with hot air and recycling the desorbed gas back through the sulfuric acid process. Flue gas compositions from coal or high sulfur fuel oil boilers are very similar to those of sulfuric acid plant tail gas. Molecular sieve adsorption followed by regeneration with a reducing gas is proposed within the process steps of the present invention. The reducing gas reacts with sulfur oxides and NOX in the subsequent processing steps.

It is a general object of the present invention to provide a flue gas treatment process for boilers and power plants burning low and high sulfur fossil fuels whereby sulfur oxide removal and nitrogen oxide elimination from the flue gas is achieved.

It is a further object of the invention to provide a flue gas treatment process in which the sulfur oxides present in the flue gas from boilers and power plants burning low and high sulfur fossil fuels (solid or liquid) are economically removed from the flue gas combustion products and chemically converted to elemental sulfur.

It is yet another object of the invention to provide a flue gas treatment process for boilers and power plants burning low and high sulfur fossil fuels whereby sulfur is recovered as a liquid elemental sulfur product and oxides of nitrogen are partially converted to non-toxic nitrogen and ammonia gases.

It is another object of the present invention to provide a flue gas treatment process which can be retrofitted to the exhaust duct of fossil fuel combustion apparatus for sulfur oxide removal and nitrogen oxide elimination from the flue gases of such apparatus.

These and other objects and advantages of the present invention will become apparent from the following summary and detailed description of the invention together with the accompanying process flow drawing.

SUMMARY OF THE INVENTION

According to the present invention there is provided a continuous process for the removal of sulfur oxides and nitrogen oxides present in the stack gases produced by the combustion of sulfur bearing carbonaceous fuels in power plants and boilers. Sulfur oxides and nitrogen oxides contained in the flue gases from such plants and boilers are removed as a more concentrated stream and converted to non-toxic substances in a series of processing steps. The flue gases exiting an existing boiler system or power plant are removed from a flue gas duct down stream of the existing electrostatic precipitator (if included in the existing boiler system or plant) and are cooled by indirect heat exchange with treated flue gas and further cooled and scrubbed essentially free of particulate matter in a scrubber/cooler which condenses a portion of the water contained in the flue gases.

The sulfur oxides and nitrogen oxides in the flue gases are next adsorbed on a bed of activated zeolite molecular sieve media. Multiple adsorbers, which are operated on a timed cycle, adsorb at least the sulfur oxides and nitrogen oxides from the flue gases. At least four such adsorption beds are employed and they are alternated between adsorption, regeneration, drying and cooling cycles. The cyclic operation of the adsorbers containing the molecular sieve beds is controlled by a timerr which rotates the gas flow through ducts leading to and exiting from the reactor beds through the required cycles in approximately equal time intervals by opening and closing appropriate valves in the interconnecting channels, ducts and piping. In the preferred process system eight molecular sieve beds are employed with four beds operating in the staggered phases of the adsorption cycle, two beds operating in staggered phases of the regeneration cycle, one bed operating in the drying cycle and one bed operating in the cooling cycle.

For the sake of simplicity the process system of the invention is described in terms of only four molecular sieve beds. Following the adsorption cycle, the first bed is regenerated by passing a hot stream of reducing gas countercurrently (upwards) through the bed to desorb the bulk of the sulfur oxides and nitrogen oxides from the molecular sieve media. The reducing gas supplies the hydrogen required in a downstream hydrogenation step where part of the sulfur oxides are partially converted to hydrogen sulfide and nitrogen oxides are converted to nitrogen and ammonia. The heat required for desorption is provided by the hot reducing gas.

Following regeneration, the adsorption media of the first bed is dried by passing a preheated slip stream of combustion air through the adsorption bed countercurrent (upwards) to the direction of flow during adsorption thereby driving off water vapor. Additional desorption of the media bed occurs as the dry, heated air removes the remaining adsorbed sulfur oxides and nitrogen oxides plus water from the media. The drying effluent is returned to the existing boiler air supply duct at a location downstream of the air preheater thus recycling any drying emissions back through the combustion chamber of the boiler or power plant system. The first adsorption bed is finally made ready for it next cyclic use as an adsorption bed for the system by passing a slip stream of unpreheated combustion air countercurrently (upwards) through the adsorber to remove traces of remaining contaminants to further dry and cool the adsorption media. Effluent from the adsorber cool down cycle enters the boiler air supply duct at a location downstream of the air preheater of the boiler or power plant system.

About sixty-five percent of the effluent gas from the adsorber regeneration cycle goes directly through a Claus reactor system. The Claus reactor system reacts the sulfur oxides with a recycle hydrogen sulfide stream forming elemental sulfur which is condensed and recovered as a liquid sulfur product. The remainder of the desorbed effluent stream from the adsorber regeneration cycle bypasses the Clause reactor system and is combined with the Claus condenser gaseous effluent with the combined stream passed through a hydrogenation reactor. The bypass stream provides a portion of the heat to raise the temperature of the combined stream to the 450°-650° F. temperature required by the hydrogenation reactor. The remainder of the heating occurs in an inline burner wherein fuel gas and air are combusted. The flow rate of the bypass stream is regulated so that the total sulfur oxide content in the Claus bypass stream plus the unconverted sulfur oxides in the Claus reactor effluent gas stream contain a combined amount of sulfur oxides such that when hydrogenated a recycle gas is produced containing hydrogen sulfide equal to twice the sulfur dioxides present in the Claus reactor feed gas. This 2 to 1 ratio between hydrogen sulfide in the recycle gas and sulfur dioxide in the Claus reactor feed maximizes elemental sulfur production with the Claus reactor. The hydrogen sulfide produced by the hydrogenation reaction is extracted from the tail gas of the hydrogenation reactor using a methyl diethanol amine (MDEA) adsorption process system or other selective acid gas solvent process system which recovers hydrogen sulfide while allowing about ninety percent of the carbon dioxide to slip through the adsorption step. Adsorbed hydrogen sulfide and about ten percent of the carbon dioxide which does not slip through the MDEA adsorber is removed from the MDEA solvent during regeneration and is recycled back to the Claus reactor system as a concentrated hydrogen sulfide stream. Hydrogen sulfide and sulfur oxide react in the Claus reactor in a 2 to 1 ratio to form elemental sulfur by the well understood reaction mechanism set forth in the follwing reaction equation:

$$2H_2S + SO_2 = 3S + 2H_2O \qquad (1)$$

The Claus reactor effluent is then passed through a condenser wherein the sulfur that is formed by reaction (1) is condensed and recovered as a liquid elemental sulfur product. The vapor from the condenser, which contains equilibrium levels of sulfur dioxide and other sulfur compounds, is combined with the Claus bypass gas stream, is heated within an inline burner, and is fed to the previously mentioned hydrogenation reactor. Hydrogen required for the hydrogenation reaction is already present in the combined stream by way of the reducing gas which was used to regenerate the adsorber bed. The hydrogen in the reducing gas of the combined stream, produced in a reducing gas generator in sufficient amount and passed through the adsorption bed during the regeneration cycle, reacts with sulfur dioxide and NOX in the hydrogenation reactor according to the following well recognized hydrogenation reaction equations (2), (3), (4), and (5).

$$SO_2 + 3H_2 = H_2S + 2H_2O \qquad (2)$$

$$2NO + 2H_2 = N_2 + 2H_2O \qquad (3)$$

$$NO + 5/2H_2 = NH_3 + H_2O \qquad (4)$$

$$2NO_2 + 4H_2 = N_2 + 4H_2O \qquad (5)$$

The flow of reducing gas is produced at a controlled rate to supply sufficient hydrogen for the above reactions plus about 10 percent excess. Hydrogen generated in the hydrogenation reactor by the water shift reaction (6) between carbon monoxide and water is used in the above reactions.

$$CO + H_2O = CO_2 + H_2 \qquad (6)$$

Chemical thermodynamic equilibrium favors almost complete reduction of sulfur dioxides and nitrogen oxides in the hydrogenation reactor at temperatures above 450° F.

BRIEF DESCRIPTION OF THE DRAWING FIGURE

The drawing depicts a flow diagram of a fossil fuel burning boiler system incorporating the adsorption system and related flue gas treatment process steps of the present invention for sulfur oxide removal and nitrogen oxide elimination from the flue gases of the boiler system before they are discharged to atmosphere.

DETAILED DESCRIPTION OF THE INVENTION

With reference to the flow diagram of the drawing figure, an existing fossil fuel fired boiler system 10 is shown to include, in block diagram sequence, a schematic representation of the following apparatus components: forced draft fan 12, air preheater (air side) 14, fire box and steam generator 16, economizer and superheater 18, air preheater (flue gas side) 20, electrostatic precipitator 22, induced draft fan 24 and stack 26. As illustrated, combustion air enters the boiler system 10 through intake duct 12a and fuel (high or low sulfur liquid or solid fossil fuel) is introduced to the fire box 16 via fuel line or duct 16a for liquid fuel as shown or with the preheated air if pulverized coal is used. Combustion air proceeds through the boiler system to the fire box 16 through duct 12b between the forced draft fan 12 and air preheater 14 (air side) and through duct 14a between air preheater 14 and the fire box 16. The combustion gases generated within the fire box 16 proceed through the boiler system 10 in basic prior art flow sequence, i.e.: from the fire box via duct 16b to the economizer and superheater 18, thence via duct 18a to the flue side of air preheater 20 (flue side), thence via duct 20a to the electrostatic precipitator 22 (to remove fly ash and carbon particles), thence via duct 22a to the inlet of induced draft fan 24, and finally via duct 24a to the stack 26 for discharge to atmosphere. All of the above mentioned components would normally be part of the existing boiler system.

In accordance with the present invention additional equipment is retrofitted to the existing boiler system to withdraw flue gas, remove contaminants from the flue gas and return treated flue gas to the existing boiler system stack for discharge to atmosphere. Combustion gases from exhaust duct 24a (leading to stack 26) are diverted by diversion valve 24b and withdrawn through duct 24c via fan 28 and compressed to a pressure of about 30 inches water gauge. The compressed exhaust gases are passed via duct 28a to gas/gas heat exchanger 30 for indirect heat exchange with treated exhaust gas thereby cooling the untreated flue gas while heating the adsorber treated exhaust gas stream. The compressed exhaust gases are next passed, via duct 30a to a direct contact quench cooler-scrubber 32 wherein the gases are further cooled and residual fly ash and particulate matter is scrubbed from the gases and removed via line 32b. A portion of water vapor contained in the exhaust gases entering the cooler-scrubber 32 is condensed and removed as the gases are cooled below dew point (to a temperature of about 100° F. to about 120° F.) by a circulating stream (not shown) of externally cooled water. Condensed water leaves cooler-scrubber 32 via duct 32a and is passed to a sour water stripper (as described hereinafter) to remove sulfur oxides which are returned to the system for further processing.

Cooled and scrubbed exhaust gases leaving cooler-scrubber 32 via duct 36a are passed to the adsorber system 34 of the invention. The adsorber system 34, as illustrated in the drawing figure, consists of at least four fixed bed adsorbers 36, 38, 40 and 42. In accordance with the invention the adsorbers are operated through a cycle in which each of the adsorbent beds goes through the sequential process steps of: flue gas adsorption by passing the gas downwardly through the bed; bed regeneration by passing a hot reducing gas upwardly through the bed; bed drying by passing preheated combustion air upwardly through the bed; and bed cool down by passing unpreheated combustion air upwardly through the bed. During the adsorption phase (first phase) of the cycle cooled and scrubbed flue gases are passed through duct 36a and into adsorber 36 of the adsorber system 34 as directed by timed sequencing valves which are not illustrated. The first adsorber 36, which as shown is in the adsorption phase of the cycle, removes oxides of sulfur and oxides of nitrogen by adsorption of these constituents onto the molecular sieve media making up the bed within the adsorber vessel. This results in a treated exhaust gas stream (leaving adsorber 36 through duct 36b) which is essentially free of the sulfur and nitrogen oxide constituents of the original flue gases generated by the boiler system 10. The treated exhaust gas in duct 36b contains less than 50 ppm of oxides of sulfur and such gas is returned to the boiler stack via duct 36b for discharge through the stack to atmosphere as a substantially sulfur oxide free and NOX free emission. In its return passage to the stack 26 of the boiler system, the treated exhaust gas in duct 36b passes through the gas/gas exchanger 30 for indirect heat exchange with the untreated exhaust gases of the boiler system and is returned to the stack inlet duct 24d downstream of diversion valve 24b.

After the adsorption media in adsorber 36 becomes saturated with the sulfur dioxide and nitrogen oxide contaminants, the timed sequencing valves of the adsorption system 34 switch such adsorber to the regeneration phase (second phase) of the cycle. Thus, adsorber 36 assumes the position and function of adsorber 38 as illustrated in the drawing figure. Hot reducing gas for use in the regeneration phase is produced in a reducing gas generator 44 by the combustion of fuel with insufficient air (in the presence of steam) and the so-produced reducing gas is passed via duct 44a to a waste heat boiler 46 wherein the reducing gas is cooled to about 650° F. by indirect heat exchange with boiler feed water introduced to the boiler 46 through line 46a. The boiler feed water is converted to high pressure steam within waste heat boiler 46 and exits such boiler at about 600 psig through steam line 46b for use as required within the gas treatment system of the invention (as described hereinafter).

The 650° F. reducing gas leaving the waste heat boiler 46 enters adsorber 38 via duct 46c and passes upwardly through the adsorption bed of the adsorber thereby regenerating the molecular sieve media of the bed contained in the adsorber. The oxides of sulfur and oxides of nitrogen adsorbed by the adsorbent media during the first phase of the adsorption cycle are essentially removed from the adsorbent media by the reducing gas producing an overhead effluent gas containing both the reducing gas and the desorbed oxides of sulfur and oxides of nitrogen and a portion of the adsorbed water. This overhead effluent gas mixture flows out of the adsorber system (adsorber 38) through duct 38a and is further processed as described hereinafter.

After the regeneration phase, during which the bulk of the adsorbed oxide constituents are removed from the adsorbent media, the timed sequencing valves of the adsorption system 34 switch such adsorber to the drying phase (third phase) of the cycle. Thus, adsorber 38 assumes the position and function of adsorber 40 as illustrated in the drawing figure. A slip stream of preheated combustion air is withdrawn from the existing boiler system 10 via duct 14a (located between air preheater 14 and the fire box 16) via duct 14b and is forced by fan 48 (in duct 14b) into adsorber 40 through inlet duct 40a. The hot combustion air from duct 40a is passed upwardly through the adsorption media bed contained within the adsorber 40 driving off retained water and any remaining adsorbed oxide constituents. The drying off-gas, which leaves adsorber 40 through overhead duct 40b, contains combustion air with traces of sulfur oxide and nitrogen oxide contaminants and is passed through duct 40b and duct 42b back to the boiler combustion chamber or fire box 16, thus recycling the trace quantities of the sulfur and nitrogen contaminants back through the combustion process for ultimate treatment.

Finally the dried adsorption media in adsorber 40 bed is made ready for its next full adsorption cycle by action of the time sequencing valves of the adsorption system 34 which switch such adsorber to the cool down phase (fourth phase) of the adsorption cycle. Thus adsorber 40 assumes the position and function of adsorber 42 as illustrated in the drawing figure. During the 4th phase of the adsorption cycle the adsorption bed of dried molecular sieve media is cooled down to a temperature below 120° F. Cooling of the adsorption bed is accomplished by passing a slip stream of unpreheated combustion air (withdrawn from duct 12b located between the boiler system's forced draft fan 12 and air preheater 14) via duct 42a to adsorber 42 for passage upwardly through the bed thereof. The heated overhead effluent gas leaving adsorber 42 is returned to the existing boiler air supply duct 14a through duct 42b thus recycling any final contaminants of the adsorbent media back through the boiler system 10 for eventual retreatment in the adsorption system and associated apparatus. As previously indicated, the overhead effluent (drying gas) leaving adsorber 40 through duct 40b joins the overhead effluent gas leaving adsorber 42 in duct 42b for return to the fire box 16.

By opening and closing the switching valves (not shown) in the inlet and outlet manifolds (not shown) of the adsorbers 36, 38, 40 and 42 in proper timed sequence, a continuous flue gas treatment process is effected in which the adsorption phase of a full adsorption cycle is carried out and completed in one of the adsorbers while simultaneously effecting a regeneration phase, a drying phase and a cool down phase in the other adsorbers of the adsorption system 34. As previously indicated, the process drawing, for illustration purposes only, shows a signle adsorber bed for each of the phase of the absorption process cycle, i.e., adsorber 36 (operating in the adsorption phase), absorber 38 (operating in the regeneration phase), adsorber 40 (operating the drying phase), and absorber 42 (operating in the cool down phase).

In actuality, for most industrial power plants and boiler systems, flue flow quantities and conditions and optimum use of adsorption media in the adsorber beds would require the use of multiple adsorbers during the adsorption phase of the cycle and multiple adsorbers during the regeneration phase. Thus, in an 8 adsorber preferred system 4 adsorbers would be required to operate in the adsorption phase (each operating at a staggered point in the adsorption phase) to treat the large volumes of flue gases generated, 2 adsorbers would be required to operate in the regeneration phase (each at a staggered point in the phase) and 1 adsorber each would operate in the drying phase and cool down phase so that a total of 8 adsorbers would be used to process the flue gases. The design of required manifold systems and switch valve systems for accomplishing the above described adsorber operation is well within the skill of power plant process engineers. Multiple parallel trains of 8 adsorber bed reactors would be used as required to treat the large volumes of flue gas produced from industrial boilers and power plants. The cycles of such parallel trains of adsorbers would also be staggered so that the composition and temperature of regeneration gas streams fed to the downstream Claus reactor and hydrogenation reactor systems is made uniform.

Referring again to the drawing figure, the desorbed overhead effluent from adsorber 38 (2 per train operating in the regeneration phase of the preferred 8 adsorber train system) flows through duct 38a and is split into two streams. A first portion of the desorbed effluent flows through duct 38b to a Claus reactor/condenser system 50 of known design. Recycle hydrogen sulfide (from a methyl diethanol amine system referred to as the MDEA system 62, as described hereinafter) is also introduced to the Claus reactor system 50 via duct 62b. Elemental sulfur is produced within the system by the well known Claus reaction wherein the recycled hydrogen sulfide is reacted with the desorbed sulfur dioxide in the effluent stream 38b and the elemental sulfur produced by such reaction is condensed in the condenser section of the reactor system 50 and recovered as elemental liquid sulfur product stream 50a. Low pressure export steam is generated in know manner from the heat recovered from the condenser section of the Claus reactor and leaves the condenser section via duct 50c. This steam is used to regenerate the MDEA solution as described hereinafter.

A controlled amount of the desorbed effluent of duct 38a flows through a bypass duct 38c to the outlet (tail gas) side of the Claus reactor system as controlled by valve 52 located in such duct. The effluent flow rate through bypass duct 38c is regulated by a $H_2S/SO_2$ analyzer-controller 54 (coupled to valve 52 and continuously analyzing samples of the tail gas received through line 54a) so that the ratio of hydrogen sulfide to sulfur dioxide in the Claus reactor tail gas (duct 50b) approximates the required 2:1 ratio. The Claus reactor tail gas in duct 50b is combined with the effluent gases in bypass duct 38c and the mixture of such gases flows through an indirect heat exchanger 56 and through an inline burner 58 to a hydrogenation reactor 60 of known design wherein hydrogenation reaction feed gas is heated to at least 450° F. Effluent gases leaving the hydrogenation reactor 60 through duct 60a are about 50° F. higher in temperature than the reactor inlet gas, are heat exchanged with feed gas by passage through exchanger 56 and are thereafter passed by duct 62a to a selective MDEA treatment and contact condenser system 62-64 of known design. Within such system the gases are cooled to about 110° F. in the contact condenser section 64 of the system (thereby condensing a substantial portion of the water contained therein) prior to passage of such gases through the MDEA section 62 of the system for recovdery and recycle of hydrogen sulfide back to the Claus reactor through duct 62b. Condensed sour water leaves the condenser section 64 of the system through line 64a. The MDEA system 62 requires intermediate pressure steam (about 50 psig) for its operation. Such steam may be conveniently provided by compressing the low pressure export steam (about 15 psig) leaving the Claus reactor 50 through duct 50c with the high pressure export steam (about 600 psig) leaving the waste heat boiler 46 through duct 46b in an eductor (not shown) and introducing the resulting intermediate pressutre steam to the MDEA system 62 through duct 62d.

Through the MDEA system 62 a hydrogen sulfide rich gas is extracted from the effluent gases derived from the conversion of sulfur oxides to hydrogen sulfide in the hydrogenation reactor and such $H_2S$ gas is recycled back to the Claus reactor 50, as previously indicated, through duct 62b. Selective solvent systems such as MDEA, or other similar solvent systems, as known to those skilled in the art, preferentially absorb hydrogen sulfide while allowing other acid gases (consisting primarily of carbon dioxide) to slip through the system with the treated gas and exit the MDEA absorber as a treated tail gas essentially free of hydrogen sulfide. Within the MDEA system the solvent is regenerated producing the concentrated hydrogen sulfide recycle stream 62b. Treated tail gas from the MDEA system (essentially free of sulfur compounds) leaves such system through duct 62c and unites with the stream of treated flue gases leaving adsorber 36 in duct 36b. The combined treated stream of gases passes, via duct 36c, through gas/gas heat exchanger 30, through duct 36d and on to duct 24d and stack 26 for discharge to atmosphere as an exhaust gas stream which is substantially free of sulfur oxides and nitrogen oxides. During passage through exchanger 30 the combined stream of exhaust gas is heated to the extent necessary to provide thermal buoyancy to assure its flow upwardly through the stack 26.

For purposes of full economical utilization of the treatment gas systems of the invention, there is provided (as shown in the drawing diagram) a sour water stripper 66 which receives the sour water leaving the contact condenser section 64 of the MDEA system through line 64a and which receives condensed sour water leaving cooler-scrubber 32 through line 32a. Within stripper 66 residual gases are stripped from the water and such gases are removed therefrom through duct 66a and join the effluent gasses leaving adsorber 38 (operating in its regeneration cycle) in duct 38a for passage in part to the Claus reactor 50 via duct 38b and in part through the Claus bypass duct 38c. Stripped water leaves stripper 66 through line 66b.

The following example illustrates the practicability and effectiveness of the flue gas treatment process of the present invention.

EXAMPLE

A 500 megawatt power plant burning 196 tons per hour of 2.5 weight percent sulfur coal with 15 percent excess air produces 5,068,000 pounds per hour of stack gas containing 19,000 pounds per hour of sulfur oxides and 3,900 pounds per hour of nitrogen oxides. The composition of this stack flue gas is shown in Table I.

TABLE I

| Constituent | Volume % |
|---|---|
| $CO_2$ | 12.9 |
| $H_2O$ | 6.6 |
| $O_2$ | 4.7 |
| $N_2$ | 75.6 |
| $SO_2$ | 1750 ppm |
| NOX | 700 ppm |
| Total | 100.0% |

In accordance with the present invention the stack gas is withdrawn downstream of the existing boiler electrostatic precipitator. After passing through a fan, the withdrawn stack gas is cooled by indirect heat exchange with treated gas and is passed through a cooler-scrubber unit wherein the gas is cooled to about 110° F. and scrubbed with water to remove remaining particulate materials and water above the saturation dew point. The cooled and scrubbed stack gas is then passed through a molecular sieve adsorbent bed system wherein 99 precent of the sulfur oxides and 90 percent of the NOX are adsorbed thereby producing a treated flue gas having an average of about 50 ppm sulfur oxides and about 70 ppm NOX.

A reducing gas for regenerating the absorbent bed system is generated by combusting 6,400 pounds moles per hour of methane gas with 55,000 pound moles per hour of air and 19,000 pound moles per hour of steam. The reducing gas is then cooled from a flame temperature of 3500° F. to 650° F. in a waste heat boiler generating 600 psig steam. The reducing gas, after cooling to 650° F., has the composition shown in Table II.

TABLE II

| Constituent | Volume % |
|---|---|
| CO | 7.6 |
| CO₂ | 5.4 |
| H₂ | 13.2 |
| N₂ | 59.0 |
| H₂O | 14.8 |
| Total | 100.0% |

The reducing gas is produced at a controlled rate so that the hydrogen contained therein is sufficient to react with all of the NOX and sulfur oxides adsorbed on the adsorbent material plus 10 percent excess. Two thirds of the sulfur oxides contained in the stack gas are hydrogenated to hydrogen sulfide while the remaining one-third reacts with the hydrogenated two-thirds in the Claus reactor forming elemental sulfur by the equilibrium controlled Claus reaction which goes approximately to 65 percent completion.

During the regeneration of the molecular sieve media, the reducing gas passed through the media bed removes the bulk of the adsorbed constituents. The temperature of the outlet gas from the adsorber, during the regeneration step, averages about 300° F. This gas is heated to the 400° F. Claus reactor inlet temperature by using a 10 percent slip stream of the reducing gas produced by the reducing gas generator of the system. Virtually no reaction occurs between the hydrogen and the sulfur oxides or nitrogen oxides during the regeneration of the adsorber since the adsorption media does not act as a catalyst for reactions between these species.

Recycle hydrogen sulfide is combined with a 65 percent portion of the desorbed effluent leaving the adsorbent bed during the regeneration step and is passed through a Claus reactor and condenser system wherein 99 long tons per day of elemental liquid sulfur is recovered while producing byproduct low pressure steam. This 15 psig steam is compressed with the 600 psig steam from the waste heat boiler in an eductor to a pressure of 50 psig for use as the steam required by the MDEA regenerator of the system. Tail gas from the Claus condenser is combined with Claus bypass gas and is reacted over a cobalt/molybdenum catalyst at 450° F. The hydrogenation of the sulfur oxides to hydrogen sulfide and NOX to nitrogen takes place in a hydrogenation reactor and the effluent of such reactor is passed through the MDEA absorption system wherein a concentrated stream of hydrogen sulfide is recovered and recycled to the Claus reactor. Treated gas from the MDEA system is combined with adsorber outlet gas, is heated to 200° F. in the gas/gas exchanger and is passed to the stack for harmless release to atmosphere.

The present invention comprises a flue gas treatment process in which the sulfur oxides present in the flue gas from boilers and power plants burning low and high sulfur fossil fuels (solid or liquid) are economically and effectively removed from the flue gas and chemically converted to elemental sulfur as a marketable product, and in which substantially all NOX are eliminated from the flue gas. While the invention has been presented through a detailed description of a process diagram and through an illustrative example of the results of operation of the described process, such description and example are not intended to be exhaustive of the application of the invention or to limit the invention to the precise forms disclosed. Many modifications and variations are possible in the light of the above teachings. It is to be understood that the invention can be used to treat gases containing sulfur oxides and/or nitrogen oxides generated by a wide variety of industrial processes. Further, it is intended that the scope of the invention be limited not by the foregoing description thereof, but rather by the claims appended hereto.

What is claimed is:

1. A continuous process for removing sulfur oxide and nitrogen oxide contaminants from the flue gas generated by industrial power plants and boiler systems burning sulfur containing fossil fuels and for converting these contaminants, respectively, into recovered elemental liquid sulfur and nitrogen, ammonia and mixtures thereof, comprising the steps of:

a) removing at least a portion of the flue gas generated by a power plant or boiler system upstream of the stack thereof, cooling said flue gas to a temperature below about 110° F., and scrubbing said gas to remove fly ash and other particulate matter and to condense water therefrom by direct contact of said flue gas in a cooler-scrubber heat exchange unit with a stream of recirculating cooling water;

b) passing the cooled and scrubbed flue gas through an adsoption system which includes at least four fixed bed adsorbers each containing an acid-resistant, hydrophobic, zeolite molecular sieve adsorbent media wherein the sulfur oxide and nitrogen oxide contaminants of said gas are selectively adsorbed by said adsorbent media, each of said adsorbers cyclically undergoing in timed sequence adsorption of said contaminants from said flue gas, regeneration of adsorbent media with a reducing gas stream which desorbs and removes said contaminants therewith, drying of said adsorbent media with a stream of preheated combustion air from said power plant or boiler system, and cooling of said adsorbent media with a stream of unpreheated combustion air from said power plant or boiler system;

c) combining a first portion of the reducing gas stream leaving the adsorbers of saida adsorption system during regeneration thereof and containing sulfur oxide and nitrogen oxide contaminants with a hydrogen sulfide rich gas stream at a temperature of about 400° F. to about 600° F. and passing said combined gas streams through a Claus reactor-condenser system over a catalyst in the reactor section thereof which is suitable for promoting the equilibrium reaction between the hydrogen sulfide and the sulfur dioxide of said combined streams to form elemental sulfur;

d) cooling the effluent gas and elemental sulfur produced in said Claus reactor-condenser system in the condenser section thereof to condense said sulfur and removing said sulfur therefrom as condensed liquid product sulfur;

e) combining the uncondensed effluent gas from the Claus reactor-condenser system with a second portion of the reducing gas stream leaving said adsorption system and containing sulfur oxide and nitrogen oxide contaminants, passing the combined stream of gases through an inline burner wherein hydrocarbon fuel gas and air are combusted in order to raise the temperature of the mixed stream of gases therein to a temperature of about 450° F. to about 750° F., and passing said heated mixed stream of gases through a hydrogenation reactor system containing a catalyst suitable to promote reactions between hydrogen and sulfur oxides and between hydrogen and nitrogen oxides to convert the sulfur oxides to hydrogen sulfide and nitrogen oxides to nitrogen, ammonia and mixtures thereof along with water vapor, said hydrogenation system also resulting in the production of a portion of the required hydrogen by the water shift reaction between carbon monoxide and water;

f) cooling the gaseous effluent of the hydrogenation reactor system to a temperature below about 110° F., condensing water above the saturation concentration therefrom, and passing said effluent through a methyl diethanol amine solvent absorption system for selectively absorbing the hydrogen sulfide from said effluent to produce a treated gas stream including carbon dioxide and other non-acid gas contaminants and containing less than about 10 ppm of hydrogen sulfide; and g) regenerating the methyl diethanol amine solvent to produce the hydrogen sulfide rich gas stream which is combined with the first portion of the reducing gas stream passed through the Claus reactor-condenser system.

2. A continuous process for removing sulfur oxide and nitrogen oxide contaminants from the flue gas generated by industrial power plants and boiler systems as claimed in claim 1 wherein fly ash and other particulate matter are scrubbed from said flue gas by recirculating cooling water in said cooler-scrubber heat exchange unit and said ash and particulate matter are removed from said water by a filter.

3. A continuous process for removing sulfur oxide and nitrogen oxide contaminants from the flue gas generated by industrial power plants and boiler systems as claimed in claim 1 wherein the cooled and scrubbed flue gas after being passed through the adsorption system is at a temperature of about 110° F. to about 130° F. and is at near atmospheric pressure.

4. A continuous process for removing sulfur oxide and nitrogen oxide contaminants from the flue gas generated by industrial power plants and boiler systems as claimed in claim 1 wherein the adsorption system includes eight fixed bed adsorbers containing the adsorbent media with four of said adsorbers cyclically undergoing in a staggered timed sequence adsorption of said contaminants from a portion of said flue gas, with two of said adsorbers cyclically undergoing in a staggered timed sequence regeneration of adsorbent media with a reducing gas stream, with one of said adsorbers cyclically undergoing in timed sequence drying of adsorbent media with a stream of combustion air, and with one of said adsorbers cyclically undergoing cooling of adsorbent media with a stream of unpreheated combustion air.

5. A continuous process for removing sulfur oxide and nitrogen oxide contaminants from the flue gas generated by industrial power plants and boiler system as claimed in claim 1 wherein the timed sequence of adsorption by, regeneration of, drying of, and cooling of the adsorbent media in said fixed bed adsorbers is automatically controlled by the cyclic operation of valves actuated by a timer and the adsorption and regeneration sequence is staggered in order to make the temperature and composition of the reducing gas stream leaving said adsorption system substantially constant.

6. A continuous process for removing sulfur oxide and nitrogen oxide contaminants from the flue gas generated by industrial power plants and boiler systems as claimed in claim 1 wherein the reducing gas stream used to desorb said contaminants from the adsorbent media during regeneration of said media is produced by the combustion of a light hydrocarbon fuel gas with deficient air and steam in a reducing gas generator and said so-produced reducing gas stream is cooled to a temperature of below 650° F. prior to its utilization for regeneration of adsorbent media.

7. A continuous process for removing sulfur oxide and nitrogen oxide contaminants from the flue gas generated by industrial power plants and boiler systems as claimed in claim 6 wherein the reducing gas stream produced in said reducing gas generator is cooled to the temperature of below 650° F. by indirect heat exchange with boiler feed water in a waste heat boiler with the result that said boiler feed water is converted to useful high pressure steam.

8. A continuous process for removing sulfur oxide and nitrogen oxide contaminants from the flue gas generated by industrial power plants and boiler systems as claimed in claim 1 wherein the stream of preheated combustion air that is used for drying the adsorbent media, after the regeneration of said media, is returned to the power plant or boiler system for use as a portion of the combustion air in the combustion chamber thereof.

9. A continuous process for removing sulfur oxide and nitrogen oxide contaminants from the flue gas generated by industrial power plants and boiler systems as claimed in claim 1 wherein the stream of unpreheated combustion air for cooling the adsorbent media, after said media has been dried, cools said dry adsorbent media to a temperature of below about 120° F. and is thereafter returned to the power plant or boiler system for use as a portion of the combustion air in the combustion chamber of the boiler thereof.

10. A continuous process for removing sulfur oxide and nitrogen oxide contaminants from the flue gas generated by industrial power plants and boiler systems as claimed in claim 1 wherein the catalyst in the hydrogenation reactor system contains a metal selected from the group consisting of Cobalt, Nickel, Rhodium, Palladium, Iridium, Platinum, Molybdenum, Chromium and mixtures thereof and said catalyst is contained on support material in said reactor system selected from the group consisting of alumina, silica, alumina-silica and mixtures thereof.

11. A continuous process for removing sulfur oxide and nitrogen oxide contaminants from the flue gas generated by industrial power plants and boiler systems as claimed in claim 1 wherein the molar amount of the sulfur dioxide in the first portion of the reducing gas stream leaving the adsorbers of said adsorption system with respect to the molar amount of the hydrogen sulfide in the rich stream thereof combined with said reducing gas stream for passage through the Claus reactor-condenser system is maintained so that the ratio of hydrogen sulfide to sulfur dioxide is 2:1.

12. A continuous process for removing sulfur oxide and nitrogen oxide contaminants from the flue gas generated by industrial power plants and boiler systems as claimed in claim 1 wherein the treated gas stream leaving the methyl diethanol amine solvent absorption system is combined with the effluent flue gas stream the adsorbers of said adsorption system and said combined gas stream is returned to said power plant or boiler system upstream of the stack thereof for discharge therefrom as a net stack gas containing less than about 5 ppm of hydrogen sulfide.

13. A continuous process for removing sulfur oxide and nitrogen oxide contaminants from the flue gas generated by industrial power plants and boiler systems as claimed in claim 1 wherein the first portion of the reducing gas stream leaving the adsorbers of said adsorption system and containing desorbed sulfur oxide and nitrogen contaminants and combined with a hydrogen sulfide rich gas stream from the methyl diethanol amine solvent absorption system system for passage to the Claus reactor-condenser system comprises about 65% of the total reducing gas stream leaving the adsorbers of said adsorption system with said contaminants.

14. A continuous process for removing sulfur oxide and nitrogen oxide contaminants from the flue gas generated by industrial power plants and boiler systems as claimed in claim 1 wherein the treated gas stream leaving the methyl diethanol amine solvent absorption system is combined with the effluent flue gas stream leaving the adsorbers of said adsorption system and said combined gas streams are heated by indirect heat exchange with the relatively hot untreated stream of the flue gas generated by said power plant or boiler system to increase the thermal buoyancy thereof and said heated combined gas streams are thereafter returned to said power plant or boiler system upstream of the stack thereof for discharge therefrom as a net stack gas containing less than about 5 ppm of hydrogen sulfide.

15. A continuous process for removing sulfur oxide and nitrogen oxide contaminants from the flue gas generated by industrial power plants and boiler systems as claimed in claim 1 wherein low pressure steam is produced within and removed from the Claus reactor-condenser system and wherein the reducing gas stream utilized to regenerate the adsorption media within the adsorbers of said adsorption system, prior to it passage through said adsorbers, is passed through a waste heat boiler wherein heat exchanged with boiler feed water producing high pressure steam.

16. A continuous process for removing sulfur oxide and nitrogen oxide contaminants from the flue gas generated by industrial power plants and boiler systems as claimed in claim 15 wherein the low pressure steam removed from the Claus reactor-condenser system is mixed with the high pressure steam produced by said waste heat boiler in an ejector producing a stream of intermediate pressure steam for use in said methyl diethanol amine solvent absorption system.

* * * * *